United States Patent Office 3,006,912
Patented Oct. 31, 1961

3,006,912
PRODUCTION OF UNSATURATED DERIVATIVES OF ETHYLENE IMINE
Karl Vierling, Heidelberg, and Heinz Oettel and Gertrud Wilhelm, Ludwigshafen (Rhine), Germany, assignors to Badische Anilin- & Soda Fabrik Aktiengesellschaft, Ludwigshafen (Rhine), Rheinland-Pfalz, Germany
No Drawing. Filed Feb. 8, 1957, Ser. No. 638,923
Claims priority, application Germany June 26, 1954
6 Claims. (Cl. 260—239)

This invention relates to new unsaturated derivatives of ethylene imine and their production.

One object of this invention is to provide new compounds which are suitable as modifying agents for polymers. A further object of this invention is to provide new compounds which are suitable as textile assistants. Another object of this invention is to provide a process of manufacturing new compounds. These objects are attained by reacting an unsaturated epoxy compound with ethylene imine or an ethylene imine derivative which is not substituted on the nitrogen atom. The reaction can be illustrated by the scheme

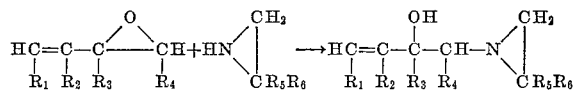

In these formulas the general symbols can have the following meaning:

$R_1$=hydrogen or a lower alkyl radical
$R_2$=hydrogen
$R_3$=hydrogen or a lower alkyl radical
$R_4$=hydrogen or $R_1$ and $R_2$ jointly constitute a bivalent alkylene radical containing preferably from 4 to 6 carbon atoms in uninterrupted sequence or a bivalent aliphatic diene radical containing 4 carbon atoms in uninterrupted sequence, or $R_1$ and $R_4$ jointly constitute a bivalent alkylene radical containing preferably from 2 to 4 carbon atoms in uninterrupted sequence, or $R_3$ and $R_4$ jointly constitute a bivalent alkylene radical containing from 4 to 6 carbon atoms in uninterrupted sequence.

The lower alkyl radicals corresponding to $R_1$ and $R_3$ can be methyl, ethyl, propyl, isopropyl, butyl and isobutyl.

The compound, in such case,

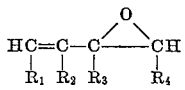

can therefore be a non-cyclic aliphatic compound without regard to the oxa propane ring.

Otherwise the characteristic chain

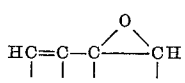

can belong with 2 or 4 carbon atoms to a carbocyclic compound. The carbocyclic compounds can be 6- to 8-membered rings of carbon atoms. Such compounds are mono-epoxides of conjugated aliphatic diolefines or cycloaliphatic diolefines. These epoxides are herein referred to as mono-epoxides of dienes or simply as unsaturated epoxides. In the cycloaliphatic compounds, the carbon atoms combined by the double linkage can lie inside or outside the ring. Epoxides of the said kind are for example epoxy-butene-(1) or monoxides of substituted butadienes, for example epoxy-(3.4)-methyl-(3)-butene-(1), (3-methyl-butadiene-monoxide-(3.4 or isoprene monoxide)), the monoxide of a sorbic acid salt, 1-vinyl-epoxy-(1.2)-cyclohexane, epoxy-(3.4)-cyclohexene-(1), 1-vinyl-epoxy-(1.2)-cyclooctane.

In

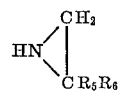

$R_5$ can be hydrogen or a lower alkyl radical, such as methyl, ethyl, propyl or butyl; the propyl or butyl radical can be branched or straight. $R_5$ can also be, together with $R_6$, —CH$_2$—CH$_2$—CH$_2$—CH$_2$—CH$_2$—. $R_6$ moreover can be H.

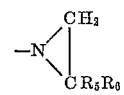

can accordingly be the radical of ethylene imine or of an ethylene imine substituted on a carbon atom, as for example C-methyl, ethyl, propyl, butyl or spirocyclohexane ethylene imine.

By the interaction of an epoxide having the general formula

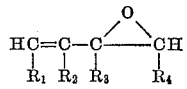

with ethylene imine or an ethylene imine derivative which is not substituted on the nitrogen atom there is formed from the epoxide a radical having the general formula

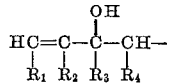

This radical is indicated by the term Z. According to the meaning of the terms $R_3$, $R_4$, $R_5$ and $R_6$ the radical Z can be a non-cyclic aliphatic radical. Otherwise the characteristic chain

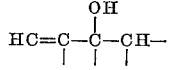

can belong with 2 or 4 carbon atoms to a cyclic compound. The cyclic compounds can be 6- to 8-membered rings.

When Z is a noncyclic aliphatic radical, Z can be a radical of the formula

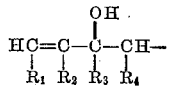

in which $R_1$, $R_2$, $R_3$ and $R_4$ can be H, $R_1$ and $R_3$ can also be lower alkyl radicals, as for example methyl, ethyl or propyl radicals. In this case Z is the radical of a 3-hydroxy derivative, for example, of butene-(1), of 3-methyl-butene-(1) (of isoprene) and of 1-alkyl-butene-(1).

When two carbon atoms of the characteristical chain

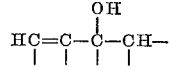

belong to a 6-membered ring, Z can be

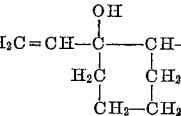

Z being in this case the radical of the 1-hydroxy derivative, for example, of 1-vinyl-cyclohexane, or

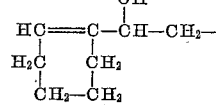

Z being in this case the radical of the alpha-hydroxy derivative, for example, of 1-ethyl-cyclohexene-(1).

When four carbon atoms of the characteristical chain

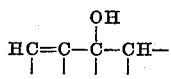

belong to a 6-membered ring, Z can be

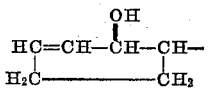

In this case Z is the radical of the 3-hydroxy derivative, for example, of cyclohexene-(1).

When the characteristical chain

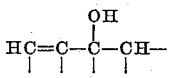

belongs to an 8-membered ring, Z can be

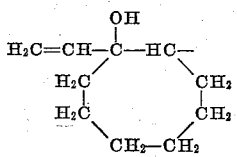

In this case Z is the radical of the 1-hydroxy derivative, for example, of 1-vinyl-cyclooctane.

Compounds obtained according to this invention can be characterized by the sequence

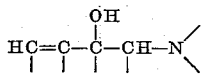

Examples of such compounds are 4-(ethylene-imino)-butene-(1)-ol-(3) having the formula

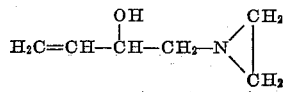

4-(ethylene-imino)-3-methyl-butene-(1)-ol-(3) having the formula

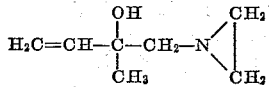

this compound being a derivative of isoprene or isopentene; 1-vinyl-1-hydroxy-2-ethylene-imino-cyclohexane having the formula

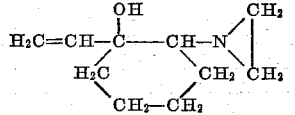

4-ethylene-imino-cyclohexene-(1)-ol-(3) having the formula

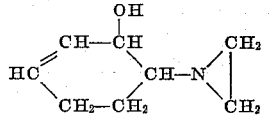

and 1-vinyl-1-hydroxy-2-ethylene-imino-cyclooctane having the formula

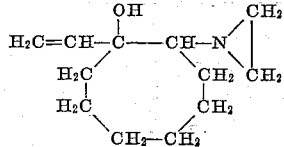

The said compounds, instead of the ethylene imine radical, can bear any of the C-substituted ethylene imine radical

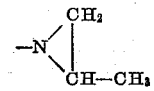

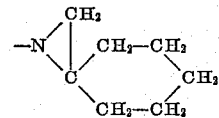

or

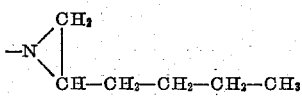

The mono-epoxy compounds of dienes coming into question for the reaction with ethylene imine or ethylene imine derivatives can be obtained by known methods, as for example according to Pummerer and Reindel, Berichte der Deutschen Chemischen Gesellschaft, volume 66, 1933, page 335. Thus, for example, 1-vinyl-epoxy-(1.2)-cyclohexane is obtained by the action of an ethereal solution of 1 mol of phthalomonoperoxy acid on 1-mol of 1-vinyl-cyclohexane-(1) at a temperature of about 0° C., extraction of the phthalic acid formed with sodium-hydrogen carbonate, distillation of the solvent and fractionation of the residue in vacuo. The 1-vinyl-epoxy-(1.2)-cyclohexane has a boiling point of 50°–52° C. at a pressure of 20 millimeters Hg ($n_D^{20}$ 1.4740). Furthermore, the mono-epoxy compounds can be prepared, for example, by the method described in the U.S. patent specification 2,561,-984, i.e. by the action of calcium hypochloride on conjugated dienes in the presence of carbon dioxide and the splitting off of hydrochloric acid from the diolefine monochlorhydrin formed with alkali. The initial material for the production of the unsaturated epoxy compounds must not be a diene however; for example 1.2-diols of suitable structure may also be used and these converted into the epoxides by conventional methods. Initial materials for the production of the mono-epoxy compounds of dienes are for example butadiene, isoprene, sorbic acid, derivatives of cyclic olefines, namely of cyclohexane or cyclooctene. Such derivatives are for example 1-vinylcyclohexene-(1) cyclohexadiene-(1.3), 1-vinylcyclooctene-(1).

For the reaction of the unsaturated epoxides with the ethylene imines the initial materials, mixed in equimolar amounts, may for example be allowed to stand for some time, for example 20 to 70 hours, at room temperature. By heating, preferably at not above 100° C., advantageously at 40° to 60° C., the reaction can be accelerated, for example to 1 to 10 hours. It is often preferable to use one component, preferably the ethylene imine of ethylene imine derivative, in excess. The initial materials will also react with each other in the presence of solvents which do not enter into combination or not into any appreciable combination therewith under the reaction conditions. Such solvents are for example water, dioxane, tetrahydrofurane or benzene. The reaction mixture remaining after distilling off the unreacted fraction and the solvent can be separated by vacuum, distillation from the higher molecular weight addition compounds formed by side reactions. The reaction of the two components, i.e. the unsaturated epoxide with the ethylene imine or ethylene imine derivative can be allowed to proceed also at temperatures below room temperature.

The products obtained, depending on the number of carbon atoms in the molecule, are soluble in water, in water and oils, or in oils. Those compounds according to this invention which contain six to eight carbon atoms in the molecule are in general still of good solubility in water. The compounds are colorless or slightly colored, readily mobile to viscous liquids or crystalline at room temperature. The compounds are valuable initial materials for plastics, and some of them are also suitable as vulcanization accelerators for rubber or as oxidation inhibitors. They can be used in the textile, paper and leather industries as dyeing assistants, impregnating or preparation agents or as other assistants. They can be polymerized in admixture with other polymerizable compounds and can thus be used for modifying these polymers. Especially in this last mentioned use, but also in the other possibilities of use, it is of importance that the compounds according to this invention contain in the molecule the double linkage and the ethylene imine ring. The non-aromatic double linkage is capable of polymerization and the ethylene imine ring can cause cross-linking which is often very desirable. A further advantage of these compounds is that they still contain the hydroxyl group which in turn is capable of various reactions.

The compounds obtained according to this invention can be subjected to further reactions which take place at the hydroxyl group, at the double linkage or at the nitrogen atom. By adding on ethylene oxide, the glycol and polyglycol ethers can be obtained. Esters can be obtained by adding on ketenes. For esterification there may also be used acid chlorides or acid anhydrides. In this case, however, an acid-binding agent must be present because otherwise the ethylene imine ring is opened.

With the aid of basic catalysts it is possible to add on a further ethylene imine radical at the double linkage. The compounds obtained according to this invention may however also be converted with the aid of polymerization catalysts into high molecular compounds by reaction at the double linkage. The tertiary nitrogen atom in the ethylene imine ring may also be quaternized by conventional agents.

The following examples will further illustrate this invention but the invention is not restricted to these examples. The parts specified are parts by weight.

*Example 1*

A solution of 2 mols of ethylene imine in ½ mol of water is allowed to drip within 1 hour into a solution of 1 mol of epoxybutene in ½ mol of water while stirring, the reaction mixture being kept below 25° C. by cooling. After standing for another 6 hours, the water is distilled off from the mixture at atmospheric pressure and then the 4-(N)-ethylene imino butene-(1)-ol-(3), briefly called ethylene imino hydroxybutene, of the formula:

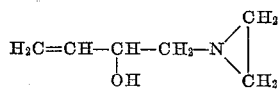

is distilled off as a mobile liquid at 60° to 63° C. at 3 Torr pressure. Its iodine number, determined by hydrogenation, amounts to 269 when using a platinum catalyst and 211 when using a palladium catalyst. In the presence of boron fluoride the compound polymerizes with rise in temperature to form a tough resin.

*Example 2*

210 parts of ethylene imine are allowed to drip into 175 parts of epoxy butene. After a few minutes, the reaction begins with spontaneous heating. The mixture is cooled so that the temperature does not exceed 30° C. After standing for several hours, 160 parts of the reaction product are distilled in vacuo. At 160° to 165° C. and 2 Torr there may be distilled off 40 parts of a dimeric byproduct and at 210° to 220° C. a byproduct which is probably trimeric. The formula

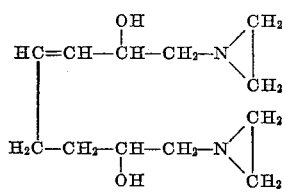

can be assigned to the dimeric compound.

*Example 3*

50 parts of C-butyl ethylene imine are allowed to drip within 1 hour into 35 parts of epoxy butene in 10 parts of water and the hole is heated for another 6 hours on a water-bath. By distilling the mixture in vacuo there are obtained 30 parts of a compound 4-(C-butyl)-ethylene imino-butene-(1)-ol-(3-) of the composition:

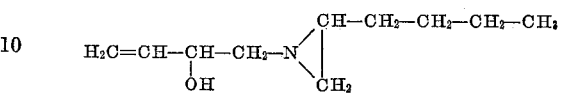

*Example 4*

30 parts of epoxy butene and 30 parts of C-methyl ethylene imine are brought together while stirring. After 12 hours the mixture is heated for some hours at 60° C. and after removing the unconverted components, the 4-(C-methyl)-ethylene-imino-butene-(1)-ol-(3) is distilled off at the boiling point of 58° to 60° C. at 1 Torr. 30 parts of this water-soluble compound are obtained. The formula is:

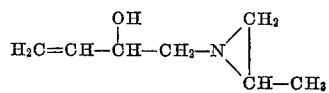

*Example 5*

20 parts of ethylene imine and 4 parts of water are added to 11 parts of cyclohexadiene-(1.3)-monoxide (prepared by the methods of Pummerer and Reindel, Berichte der Deutschen Chemischen Gesellschaft, volume 66, 1933, page 335). After standing for 3 hours at room temperature, the unreacted components are removed and the 4-ethylene-imino-cyclohexene-(1)-ol-(3) formed distilled off at the boiling point of 95° to 98° C. at 0.3 Torr. 10 parts of this water-soluble compound are obtained. The formula is:

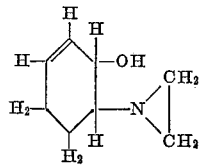

*Example 6*

11 parts of ethylene imine and 5 parts of water are added while stirring to 10 parts of isoprene monoxide, the reaction mixture being kept below 35° C. by cooling. After standing for several hours, the unreacted components are distilled off and then, at 40° to 43° C. at 0.2 Torr, about 8 parts of the water-soluble ethylene imino hydroxyisopentene 4-ethylene-imino-3-methyl-butene-(1)-ol-(3). The formula is:

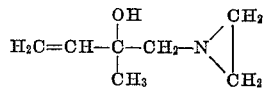

*Example 7*

3 parts of water and 13 parts of ethylene imine are added while stirring to 18 parts of 1-vinyl-epoxy-(1.2)-cyclohexane (prepared by the methods of Pummerer and Reindel, Berichte der Deutschen Chemischen Gesellschaft, volume 66, 1933, page 335). The mixture is heated for 10 hours at 50° C. and the unreacted components are distilled off and thereafter, at the boiling point of 82° C. at 0.2 Torr, 11 parts of the water-soluble 1-vinyl-1-hydroxy-ethylene-imino-cyclohexane. The formula is:

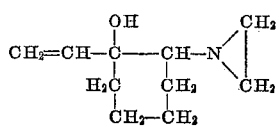

Example 8

A mixture of 6 parts of 1-vinyl-epoxy-(1.2)-cyclohexane, 6 parts of C-methyl-ethylene imine and 2 parts of water is heated for 5 hours at 50° C. while stirring and then the unreacted components are distilled off and then about 4 parts of a compound having the refractive index $n_D^{20}=1.485$ are distilled off at the boiling point 68° to 69° C. at 0.2 Torr. It is indicated as 1-vinyl-1-hydroxy - 2 - (C - methyl) - ethylene - imino - cyclohexane, to which is assigned the formula:

$$\underset{H}{\bigcirc}\begin{matrix}CH=CH_2\\OH\\N\end{matrix}\begin{matrix}CH_2\\|\\CH-CH_3\end{matrix}$$

By an otherwise similar procedure, but without the addition of water, 5 parts of the said compound are obtained.

Example 9

A mixture of 10 parts of isoprene monoxide and 15 parts of C-methyl ethylene imine is heated for 5 hours at 55° C. while stirring. The unreacted components are distilled off and then, at the boiling point 44° to 46° C. at 0.5 Torr, about 11 parts of a compound having the refractive index $n_D^{20}=1.461$. It is indicated as 4-(C-methyl) - ethylene - imino 3 - methyl - butene - (1) - ol-(3) to which is assigned the formula:

$$H_2C=CH-\underset{\underset{OH}{|}}{\overset{\overset{CH_3}{|}}{C}}-CH_2-N\begin{matrix}CH_2\\|\\CH-CH_3\end{matrix}$$

Example 10

23 parts of spirocyclohexane ethylene imine of the boiling point 55° to 60° C. at 16 Torr and the refractive index $n_D^{20}=1.4720$, obtained in known manner by the action of alkali on 1-amino-1-chlormethyl-cyclohexane are added to 10 parts of epoxy butene. The reaction mixture is heated to 60° C. for 8 hours while stirring. After distilling off the unreacted components, there are obtained at the boiling point 83° to 85° C. at 0.1 Torr about 5 parts of a compound having the refractive index $n_D^{20}=1.496$. It is indicated as 4-(spirocyclohexane-ethylene-imino) butene-(1)-ol-(3) to which is assigned the formula:

$$H_2C=CH-CH-\underset{\underset{OH}{|}}{CH}-N\overset{\bigcirc}{\underset{CH_2}{\diagup}}$$

Example 11

26 parts of ethylene oxide are led into 22 parts of ethylene imino hydroxybutene at elevated temperature (about 60° C.). The reaction product contains 3 ethoxy groups per molecule. The 1% aqueous solution has a surface tension of 42 dyne-cm.$^{-1}$.

Example 12

11 parts of ethylene imino hydroxybutene are heated with 0.5 part of sodium methylate and 52 parts of ethylene oxide for 24 hours at 65° to 70° C. 10 ethoxy groups are thereby added on per molecule.

Example 13

8.4 parts of diketene are added to 11 parts of ethylene imino hydroxybutene (obtained according to Example 1) dissolved in 20 parts of benzene. After allowing to stand for 24 hours and distilling off the unreacted components, a compound is obtained to which is assigned the following formula confirmed by the infra-red spectrum:

$$CH_2=CH-CH-CH_2-N\begin{matrix}CH_2\\|\\CH_2\end{matrix}$$
$$|$$
$$O$$
$$|$$
$$CO$$
$$|$$
$$CH_2$$
$$|$$
$$CO$$
$$|$$
$$CH_3$$

Example 14

A mixture of 20 parts of triethylamine and 22 parts of ethylene imino hydroxybutene is allowed to drip into 22 parts of dimethylcarbamic acid chloride dissolved in 50 parts of benzene. After prolonged standing the hydrochloride of trimethylamine forms and is separated. After distilling off the solvent and the unreacted substances there remain 23 parts of a compound of the formula:

$$H_2C=CH-CH-CH_2-N\begin{matrix}CH_2\\|\\CH_2\end{matrix}$$
$$|$$
$$O-CO-N\begin{matrix}CH_3\\|\\CH_3\end{matrix}$$

This application is a continuation-in-part application of our application Ser. No. 517,942, filed June 24, 1955, now abandoned.

We claim:

1. A compound of the formula $$H_2C=CH-\underset{\underset{OH}{|}}{CH}-CH_2-N\begin{matrix}CH_2\\|\\CH_2\end{matrix}$$

2. A compound of the formula $$H_2C=CH-\underset{\underset{OH}{|}}{CH}-CH_2-N\begin{matrix}CH_2\\|\\CH-CH_3\end{matrix}$$

3. A compound of the formula $$H_2C=CH-\underset{\underset{CH_3}{|}}{\overset{\overset{OH}{|}}{C}}-CH_2-N\begin{matrix}CH_2\\|\\CH_2\end{matrix}$$

4. A compound of the formula $$H_2C=CH-\underset{\underset{CH_3}{|}}{\overset{\overset{OH}{|}}{C}}-CH_2-N\begin{matrix}CH_2\\|\\CH-CH_3\end{matrix}$$

5. A compound selected from the group consisting of $$HC=CH-\underset{\underset{R_1}{|}}{\overset{\overset{OH}{|}}{C}}-CH_2-N\begin{matrix}CH_2\\|\\R\end{matrix}$$
$$R_3$$

$$CH=\!=\!=\!C-\underset{}{CH}-CH_2-N\begin{matrix}OH\\|\\R\end{matrix}\begin{matrix}CH_2\\|\\R\end{matrix}$$
$$\underset{}{\underline{\qquad(CH_2)_x\qquad}}$$

$$CH=CH-\underset{\underset{}{|}}{CH}-CH-N\begin{matrix}OH\\|\\R\end{matrix}\begin{matrix}CH_2\\|\\R\end{matrix}$$
$$\underset{}{\underline{\qquad(CH_2)_y\qquad}}$$

and $$CH=CH-\underset{}{C}\!\!-\!\!-\!\!-\!\!-\!\!CH-N\begin{matrix}OH\\|\\R\end{matrix}\begin{matrix}CH_2\\|\\R\end{matrix}$$
$$\underset{}{\underline{\qquad(CH_2)_x\qquad}}$$

wherein R is a bivalent radical selected from the group consisting of $>CH_2$, $>CHR'$ wherein $R'$ is an alkyl group of 1–4 carbons, and

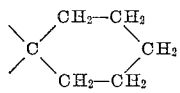

$R_1$ and $R_3$ are selected from the group consisting of hydrogen and an alkyl group of 1–4 carbons, $x$ is an even integer between 4 and 6, inclusive, and $y$ is an even integer between 2 and 4, inclusive.

6. A process for preparing a compound selected from the group consisting of

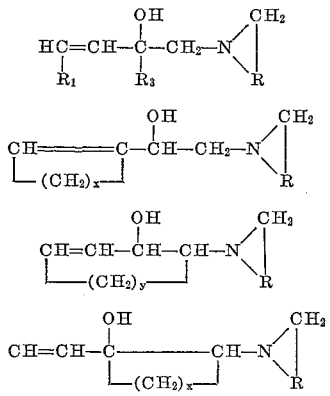

wherein R is a bivalent radical selected from the group consisting of $>CH_2$, $>CHR'$ wherein $R'$ is an alkyl group of 1–4 carbons, and

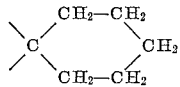

$R_1$ and $R_3$ are selected from the group consisting of hydrogen and an alkyl group of 1–4 carbons, $x$ is an even integer between 4 and 6, inclusive, and $y$ is an even integer between 2 and 4, inclusive, which process comprises reacting at a temperature not above 100° C. an imine of the formula

wherein R has the meaning set forth above with an epoxy compound selected from the group consisting of

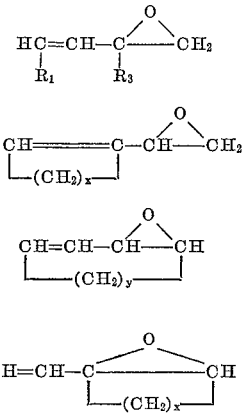

and wherein $R_1$, $R_3$, $x$ and $y$ have the meaning set forth above.

References Cited in the file of this patent

UNITED STATES PATENTS

| | | |
|---|---|---|
| 2,533,085 | Blicke | Dec. 5, 1950 |
| 2,802,823 | Tolkmith et al. | Aug. 12, 1957 |
| 2,906,592 | Reeves et al. | Sept. 29, 1959 |

FOREIGN PATENTS

| | | |
|---|---|---|
| 783,728 | Great Britain | Sept. 25, 1957 |